US009683719B2

(12) United States Patent
Takatori

(10) Patent No.: US 9,683,719 B2
(45) Date of Patent: Jun. 20, 2017

(54) LUMINOUS FLUX CONTROL MEMBER, LIGHT-EMITTING DEVICE, SURFACE LIGHT SOURCE DEVICE, AND DISPLAY DEVICE

(71) Applicant: Enplas Corporation, Saitama (JP)

(72) Inventor: Hiroshi Takatori, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/423,483

(22) PCT Filed: Jun. 11, 2013

(86) PCT No.: PCT/JP2013/003650
§ 371 (c)(1),
(2) Date: Feb. 24, 2015

(87) PCT Pub. No.: WO2014/033985
PCT Pub. Date: Mar. 6, 2014

(65) Prior Publication Data
US 2015/0260371 A1 Sep. 17, 2015

(30) Foreign Application Priority Data

Aug. 27, 2012 (JP) ................................ 2012-186459
Mar. 26, 2013 (JP) ................................ 2013-064009

(51) Int. Cl.
F21V 7/00 (2006.01)
F21V 13/02 (2006.01)
(Continued)

(52) U.S. Cl.
CPC .............. F21V 7/0066 (2013.01); F21K 9/60 (2016.08); F21V 13/02 (2013.01);
(Continued)

(58) Field of Classification Search
CPC ........ F21V 13/04; F21V 7/0066; F21V 5/005; F21V 5/002; F21V 5/045
(Continued)

(56) References Cited

U.S. PATENT DOCUMENTS 6,142,652 A 11/2000 Richardson
7,244,050 B2 * 7/2007 Summerford ............. F21V 5/02
362/299

(Continued)

FOREIGN PATENT DOCUMENTS

JP 2007-294187 A 11/2007
JP 2008-305923 A 12/2008
(Continued)

OTHER PUBLICATIONS

International Search Report for PCT/JP2013/004949 mailed Jul. 30, 2013.
(Continued)

Primary Examiner — Peggy Neils
Assistant Examiner — William N Harris
(74) Attorney, Agent, or Firm — Brundidge & Stanger, P.C.

(57) ABSTRACT

This luminous flux control member has: an incidence surface through which light emitted from a light-emitting element enters; an emission surface through which the light entering from the incidence surface is emitted to the outside; and multiple ridges that are formed on the back side so as to surround the central axis (CA) and that have a substantially triangular cross-sectional shape. Each of the multiple ridges has a first reflecting surface, a second reflecting surface, and a ridge line which is the line of intersection of the first reflecting surface and the second reflecting surface. An
(Continued)

imaginary line containing the ridge lines intersects the central axis (CA) at a position closer to the front side than the ridge lines.

4 Claims, 20 Drawing Sheets

(51) Int. Cl.
  *G02B 19/00* (2006.01)
  *G02F 1/1335* (2006.01)
  *F21K 9/60* (2016.01)
  *F21V 5/04* (2006.01)
  *F21Y 115/10* (2016.01)

(52) U.S. Cl.
  CPC ... *G02B 19/0047* (2013.01); *G02F 1/133603* (2013.01); *G02F 1/133606* (2013.01); *F21V 5/04* (2013.01); *F21Y 2115/10* (2016.08); *G02F 2001/133607* (2013.01)

(58) Field of Classification Search
  USPC .............................. 362/97.1, 307, 309, 327
  See application file for complete search history.

(56) References Cited

U.S. PATENT DOCUMENTS

| | | | | |
|---|---|---|---|---|
| 7,866,855 B2* | 1/2011 | Abdelsamed | ............ | F21V 5/02 362/297 |
| 2008/0013322 A1 | 1/2008 | Ohkawa | | |
| 2008/0303757 A1 | 12/2008 | Ohkawa et al. | | |
| 2009/0116245 A1* | 5/2009 | Yamaguchi | ............... | G02B 3/04 362/311.01 |
| 2010/0002320 A1* | 1/2010 | Minano | ..................... | F21V 7/04 359/850 |
| 2010/0135028 A1* | 6/2010 | Kokubo | .................... | G02B 3/02 362/311.06 |
| 2010/0208453 A1* | 8/2010 | Kimura | ............. | G02F 1/133606 362/97.2 |
| 2012/0314424 A1* | 12/2012 | Ohkawa | ............ | G02F 1/133606 362/327 |
| 2013/0265777 A1* | 10/2013 | Zollers | .................... | F21V 13/04 362/327 |

FOREIGN PATENT DOCUMENTS

| | | |
|---|---|---|
| JP | 2009-043628 A | 2/2009 |
| JP | 2009-117207 A | 5/2009 |
| JP | 2011-023204 A | 2/2011 |

OTHER PUBLICATIONS

Extended European Search Report for EP 13833336.4 dated Jan. 22, 2016.

Office Action for European Patent Application No. 13833336.4 dated May 3, 2017.

* cited by examiner

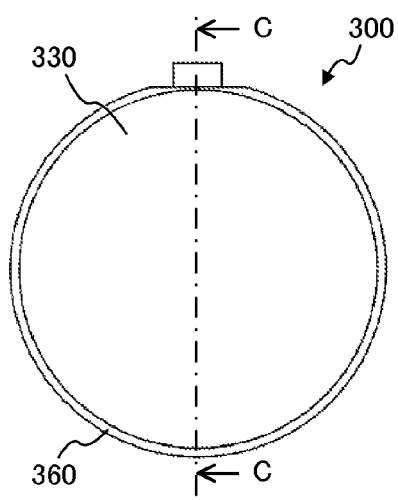
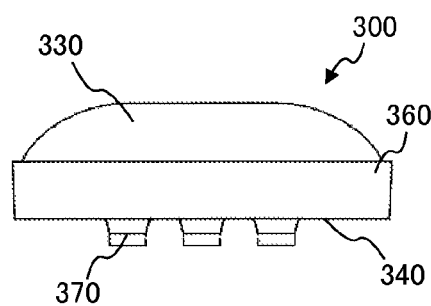
FIG. 9A　　　　　　　FIG. 9B
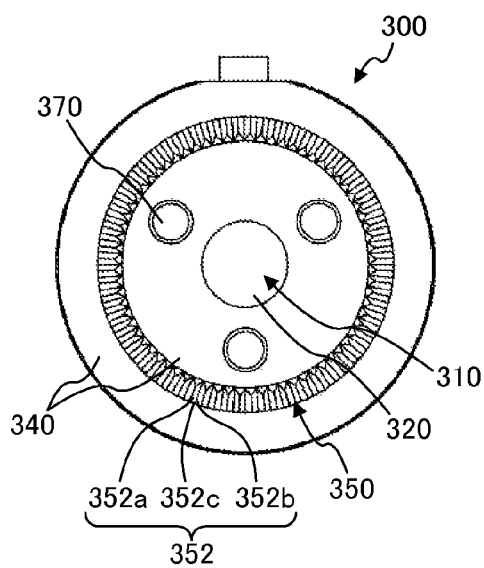
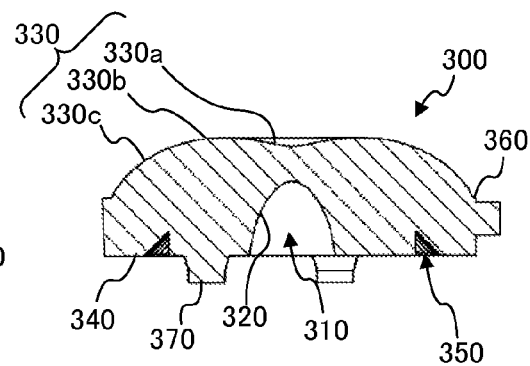
FIG. 9C　　　　　　　FIG. 9D

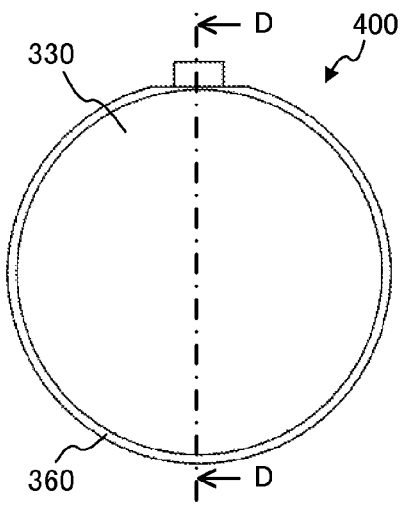
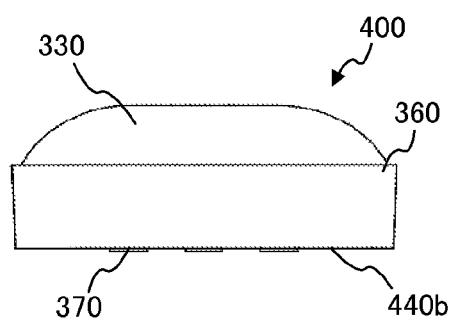
FIG. 17A     FIG. 17B
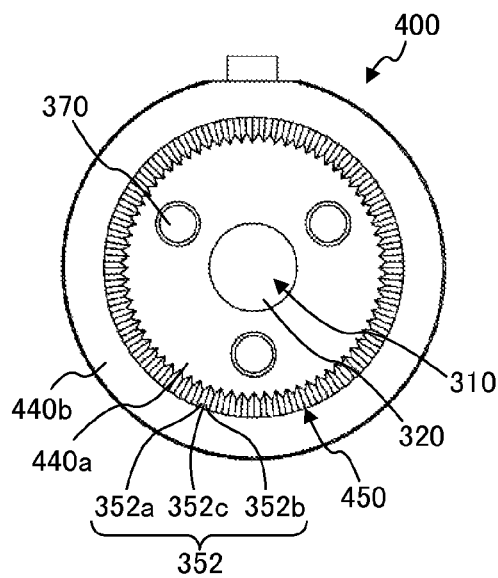
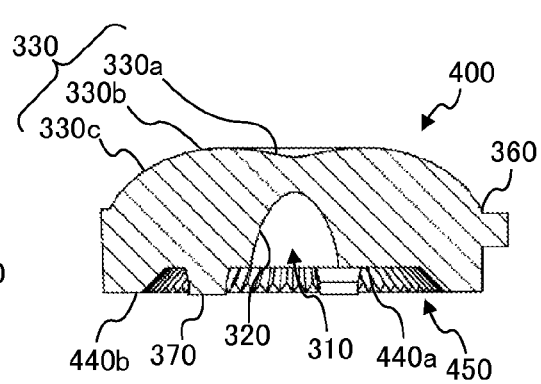
FIG. 17C     FIG. 17D

LUMINOUS FLUX CONTROL MEMBER, LIGHT-EMITTING DEVICE, SURFACE LIGHT SOURCE DEVICE, AND DISPLAY DEVICE

TECHNICAL FIELD

The present invention relates to a light flux controlling member configured to control the distribution of light emitted from a light emitting element. Further, the present invention relates to a light emitting device including the light flux controlling member, a surface light source device including the light emitting device, and a display apparatus including the surface light source device.

BACKGROUND ART

Some transmission type image display apparatuses such as liquid crystal display apparatuses employ a direct-type surface light source device as a backlight. In recent years, a direct-type surface light source device including a plurality of light emitting elements has been increasingly used as a light source.

A direct-type surface light source device has, for example, a substrate, a plurality of light emitting elements, a plurality of light flux controlling members (lenses) and a light diffusion member. The plurality of light emitting elements are disposed in a matrix on the substrate. Over each light emitting element, the light flux controlling member is disposed for expanding light emitted from each light emitting element in the surface directions of the substrate. The light output from the light flux controlling member is diffused by the light diffusion member, and planarly illuminates a member to be irradiated (e.g. a liquid crystal panel).

FIGS. 1A to 1C illustrate a configuration of a conventional light flux controlling member. FIG. 1A is a perspective view from the rear side, FIG. 1B is a cross-sectional perspective view from the rear side, and FIG. 1C is a cross-sectional view. In FIGS. 1A and 1B, legs formed on the rear side are not illustrated. As illustrated in FIGS. 1A to 1C, conventional light flux controlling member 20 includes incidence surface 22 on which light emitted from a light emitting element is incident and emission surface 24 for outputting the light entered from incidence surface 22 toward the outside. Incidence surface 22 is a surface with a recessed shape relative to the light emitting element and formed so as to face the light emitting surface of the light emitting element.

FIGS. 2A to 2C are illustrations of optical paths in light flux controlling member 20. FIG. 2A is an illustration of an optical path of a beam with emission angle 30°, FIG. 2B is an illustration of an optical path of a beam with emission angle 40°, and FIG. 2C is an illustration of an optical path of a beam with emission angle 50°. As used herein, "emission angle" (θ in FIG. 2A) means an angle of a beam relative to optical axis LA of light emitting element 10. Also in FIGS. 2A to 2C, legs formed on the rear side are not illustrated.

As illustrated in FIGS. 2A to 2C, the light emitted from light emitting element 10 enters the inside of light flux controlling member 20 from incidence surface 22. The light entered light flux controlling member 20 reaches emission surface 24, and is output toward the outside from emission surface 24 (solid arrow). At this time, the light is refracted according to the shape of emission surface 24, so that the traveling direction of the light can be controlled. On the other hand, part of the light reached emission surface 24 is reflected by emission surface 24 (Fresnel reflection) and reaches rear surface 26 facing the substrate on which light emitting element 10 is mounted (dashed arrow). When the light reached rear surface 26 is reflected by rear surface 26, excessive light travels in the direction directly above light flux controlling member 20 and therefore, luminance unevenness occurs. When the light reached rear surface 26 is output from rear surface 26, the light is absorbed into the substrate and therefore, the loss of light is large.

It is undesirable that the light reflected by emission surface 24 travel in the direction directly above light flux controlling member 20 or be absorbed into the substrate. PTL 1 proposes a light flux controlling member that can solve the above problems.

FIGS. 3A to 3C illustrate a configuration of a light flux controlling member disclosed in PTL 1. FIG. 3A is a perspective view from the rear side, FIG. 3B is a cross-sectional perspective view from the rear side, and FIG. 3C is a cross-sectional view. In FIGS. 3A and 3B, legs formed on the rear side are not illustrated. As illustrated in FIGS. 3A to 3C, in light flux controlling member 30 disclosed in PTL 1, annular inclining surface 32 is formed in rear surface 26. Inclining surface 32 is rotationally symmetric (circularly symmetric) about central axis CA of light flux controlling member 30, and inclined at a predetermined angle (e.g. 45°) relative to central axis CA.

FIGS. 4A to 4C are illustrations of optical paths in light flux controlling member 30. FIG. 4A is an illustration of an optical path of a beam with emission angle 30°, FIG. 4B is an illustration of an optical path of a beam with emission angle 40°, and FIG. 4C is an illustration of an optical path of a beam with emission angle 50°. Also in FIGS. 4A to 4C, legs formed on the rear side are not illustrated. As illustrated in FIGS. 4A to 4C, light reflected by emission surface 24 reaches inclining surface 32 in light flux controlling member 30. Then, part of the light reached inclining surface 32 is reflected by inclining surface 32 and travels in a lateral direction (see FIGS. 4A and 4B).

In this way, in light flux controlling member 30 disclosed in PTL 1, the light reflected by emission surface 24 does not easily travel in the direction directly above light flux controlling member 30 or is not easily absorbed into the substrate. Therefore, a light emitting device including light flux controlling member 30 disclosed in PTL 1 can radiate light more efficiently and uniformly than a light emitting device including conventional light flux controlling member 20.

CITATION LIST

Patent Literature

PTL 1: Japanese Patent Application Laid-Open No. 2009-43628

SUMMARY OF INVENTION

Technical Problem

As illustrated in FIG. 4C, even in light flux controlling member 30 disclosed in PTL 1, when a beam has a large emission angle, part of light reflected by emission surface 24 may reach the substrate under light flux controlling member 30 after passing through inclining surface 32 according to the angle of inclining surface 32. The light reached the substrate under light flux controlling member 30 in this way may be reflected by the surface of the substrate to travel in the direction directly above light flux controlling member 30, or may be absorbed into the substrate. From the perspective of energy saving, it is preferable to reduce the amount of light passing through inclining surface 32 as much as possible.

An object of the present invention is to provide a light flux controlling member configured to control the distribution of light emitted from a light emitting element, the light flux controlling member being capable of using light reflected by an emission surface more efficiently while preventing the occurrence of luminance unevenness.

Another object of the present invention is to provide a light emitting device including the light flux controlling member, a surface light source device including the light emitting device, and a display apparatus including the surface light source device.

Solution to Problem

A light flux controlling member configured to control the distribution of light emitted from a light emitting element, the light flux controlling member includes: an incidence surface formed on a rear side of the light flux controlling member so as to intersect a central axis of the light flux controlling member, the incidence surface being configured such that light emitted from the light emitting element is incident on the incidence surface; an emission surface formed on a front side of the light flux controlling member so as to intersect the central axis, the emission surface being configured to output light entered from the incidence surface toward outside; and a plurality of linear protrusions each having a cross-section that is substantially triangle-shaped, the linear protrusions being formed to surround the central axis; wherein each of the plurality of linear protrusions includes a first reflection surface, a second reflection surface, and a ridge line that is an intersection line of the first reflection surface and the second reflection surface, the plurality of linear protrusions are disposed rotationally symmetric about the central axis, and a virtual line including the ridge line intersects the central axis at a position which is farther into a front side area of the light flux controlling member than the ridge line.

A light emitting device of the present invention includes a light emitting element and the light flux controlling member of the present invention, wherein the light flux controlling member is disposed such that the central axis thereof coincides with the optical axis of the light emitting element.

A surface light source device of the present invention includes the light emitting device of the present invention and a light diffusion member which is configured to diffuse and transmit the light emitted from the light emitting device at the same time.

A display apparatus of the present invention includes the surface light source device of the present invention and a display member to which light emitted from the surface light source devices is radiated.

Advantageous Effects of Invention

A light emitting device including a light flux controlling member of the present invention can radiate light more efficiently and uniformly than a light emitting device including a conventional light flux controlling member. Therefore, a surface light source device and display apparatus of the present invention have higher light use efficiency and less luminance unevenness occurrence than conventional ones.

BRIEF DESCRIPTION OF DRAWINGS

FIGS. 9A to 9D illustrate the configuration of the light flux controlling member according to Embodiment 1;

FIGS. 17A to 17D illustrate the configuration of the light flux controlling member according to Embodiment 2;

DESCRIPTION OF EMBODIMENTS

Hereinafter, embodiments of the present invention will be described in detail with reference to the accompanying drawings. In the following description, as representative examples of surface light source devices of the present invention, surface light source devices suitable for backlights of liquid crystal display apparatuses or the like will be described. These surface light source devices may be used as display apparatuses in combination with members to be irradiated (e.g. liquid crystal panels) to which light from the surface light source devices is radiated.

Embodiment 1

(Configurations of Surface Light Source Device and Light Emitting Device)

Figure 5A:
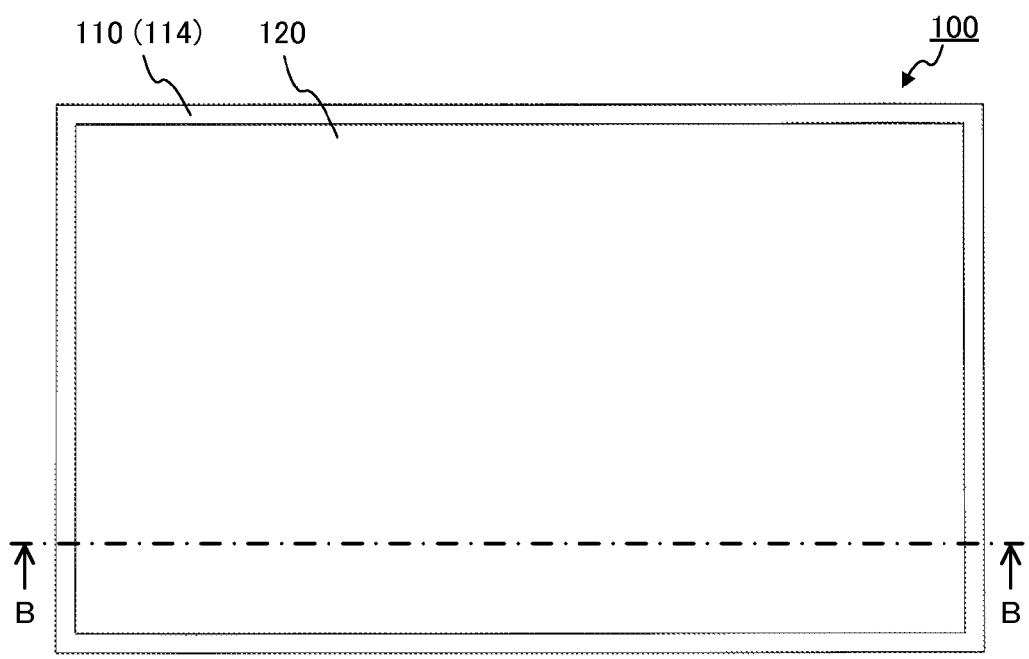
FIGS. 5A and 5B illustrate a configuration of a surface light source device according to Embodiment 1.
Figure 5B:
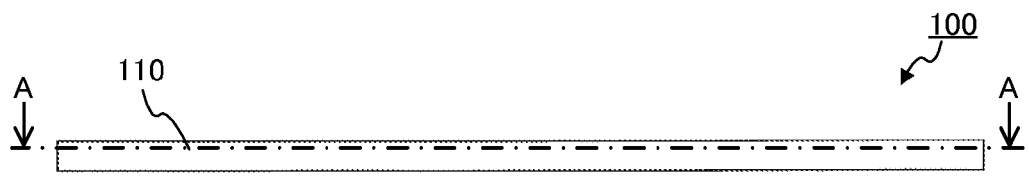
Figure 6A:
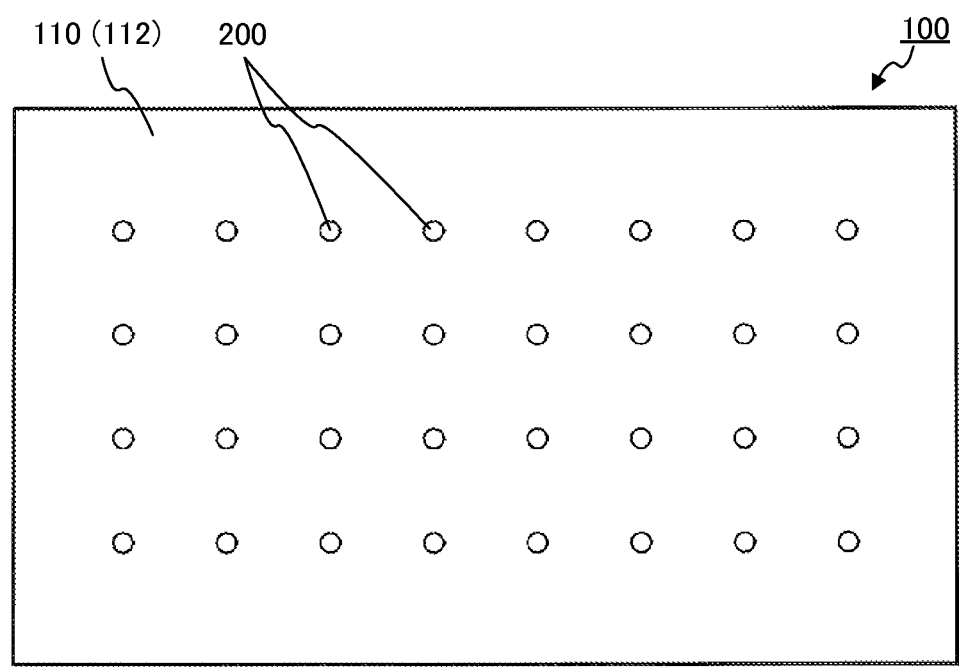
FIGS. 6A and 6B are cross-sectional illustrations illustrating the configuration of the surface light source device according to Embodiment 1.
Figure 6B:
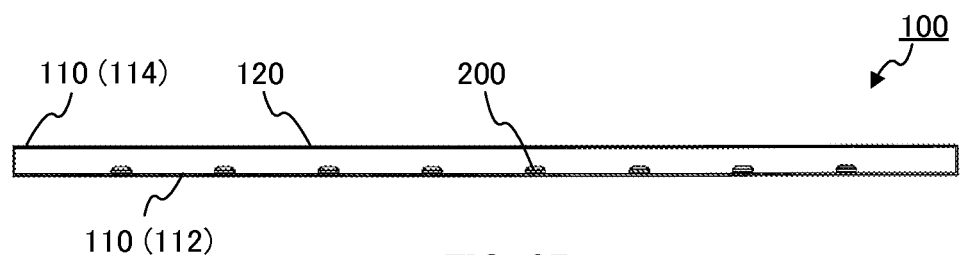
Figure 7:
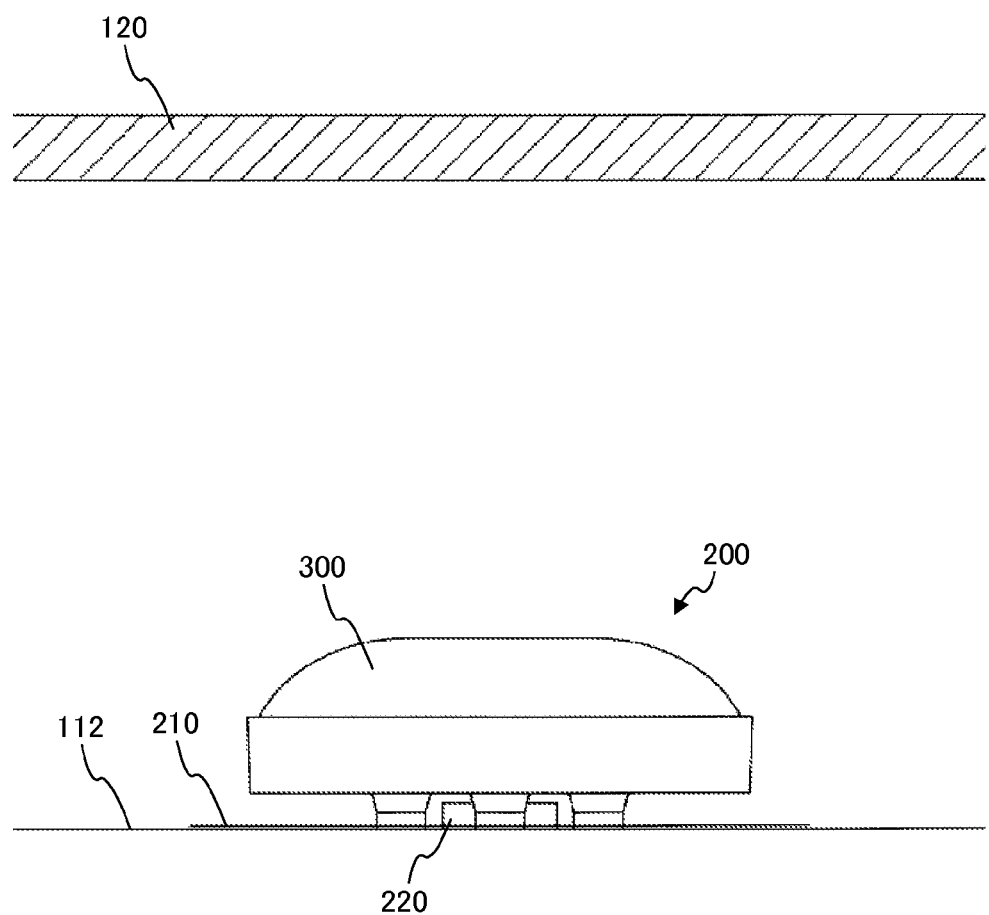
FIG. 7 is a partially enlarged cross-sectional view of an enlarged part of FIG. 6B.

FIGS. 5A to 7 illustrate a configuration of a surface light source device according to Embodiment 1. FIG. 5A is a plan view, and FIG. 5B is a front view. FIG. 6A is a cross-sectional view taken along line A-A shown in FIG. 5B, and FIG. 6B is a cross-sectional view taken along line B-B shown in FIG. 5A. FIG. 7 is a partially enlarged cross-sectional view of an enlarged part of FIG. 6B.

As illustrated in FIGS. 5A to 6B, surface light source device 100 according to Embodiment 1 includes casing 110, a plurality of light emitting devices 200, and light diffusion member 120. Light emitting devices 200 are disposed in a matrix on bottom plate 112 of casing 110. The inner surface of bottom plate 112 functions as a diffusion and reflection surface. Top plate 114 of casing 110 has an opening. Light diffusion member 120 is disposed so as to fill the opening, and functions as a light emitting surface. The size of the light emitting surface is, for example but not limited to, about 700 mm in length and about 400 mm in width.

As illustrated in FIG. 7, each of light emitting devices 200 is fixed to each of substrates 210. Each of substrates 210 is fixed on bottom plate 112 of casing 110 at each predetermined position. Each of light emitting devices 200 includes light emitting element 220 and light flux controlling member 300.

Light emitting element 220 is a light source of surface light source device 100, and mounted on substrate 210. Light emitting element 220 is a light-emitting diode (LED) such as a white light emitting diode.

Light flux controlling member 300 is a diffusion lens configured to control the distribution of light emitted from light emitting element 220, and fixed on substrate 210. Light flux controlling member 300 is disposed over light emitting element 220 such that central axis CA thereof coincides with optical axis LA of light emitting element 220 (see FIG. 10). Later-described incidence surface 320 and emission surface 330 of light flux controlling member 300 are both rotationally symmetric (circularly symmetric), and rotation axes thereof coincide with each other. The axes of incidence surface 320 and emission surface 330 are hereinafter referred to as "central axis CA of the light flux controlling member." Further, "optical axis LA of the light emitting element" means a center beam of a three-dimensional light flux from light emitting element 220. A gap to release generated heat from light emitting element 220 to the outside is formed between substrate 210 on which light emitting element 220 is mounted and rear surface 340 of light flux controlling member 300.

Light flux controlling member 300 is formed by integral molding. The material of light flux controlling member 300 is not particularly limited as long as light with desired wavelength can pass through. For example, the material of light flux controlling member 300 is a light-transmissive resin such as polymethylmethacrylate (PMMA), polycarbonate (PC) or epoxy resin (EP), or glass.

A main feature of surface light source device 100 according to the present embodiment lies in a configuration of light flux controlling member 300. Therefore, light flux controlling member 300 will be described in detail later.

Light diffusion member 120 is a plate-shaped member having light diffusivity, and configured to diffuse and transmit the light emitted from light emitting device 200 at the same time. Normally, the size of light diffusion member 120 is substantially the same as the size of a member to be irradiated such as a liquid crystal panel. For example, light diffusion member 120 is formed of a light-transmissive resin such as polymethylmethacrylate (PMMA), polycarbonate (PC), polystyrene (PS) or styrene-methylmethacrylate copolymer resin (MS). To confer light diffusivity, fine irregularities are formed on the surface of light diffusion member 120, or light diffusion elements such as beads are dispersed in light diffusion member 120.

In surface light source device 100 according to the present embodiment, light emitted from each light emitting element 220 is expanded by light flux controlling member 300 to illuminate a broad region of light diffusion member 120. Further, the light output from each light flux controlling member 300 is diffused by light diffusion member 120. As a result, surface light source device 100 according to the present embodiment can uniformly illuminate a planar member to be irradiated (e.g. liquid crystal panel).

(Configuration of Light Flux Controlling Member)

Figure 8A:
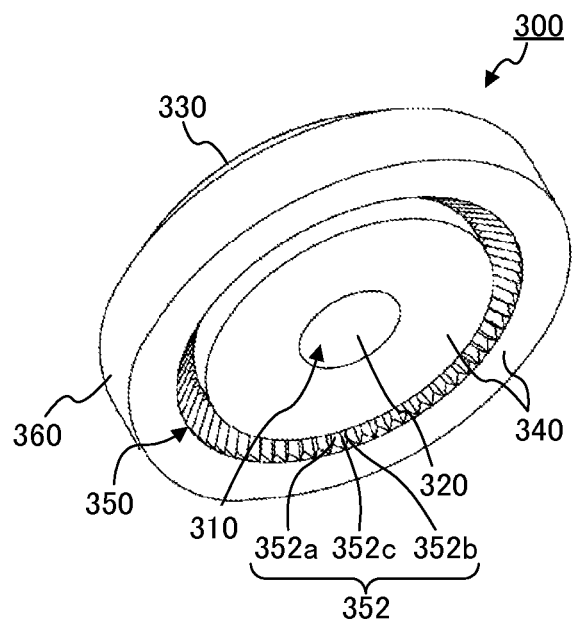
FIGS. 8A and 8B illustrate a configuration of a light flux controlling member according to Embodiment 1.
Figure 8B:
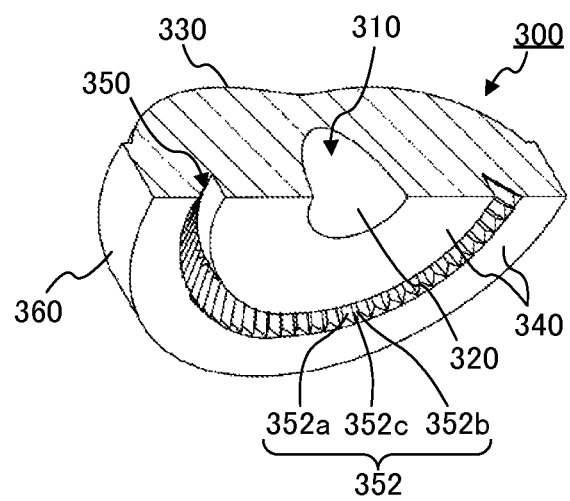

FIGS. 8A to 9D illustrate a configuration of light flux controlling member 300 according to Embodiment 1. FIG. 8A is a perspective view from the rear side, and FIG. 8B is a cross-sectional perspective view from the rear side. FIG. 9A is a plan view, FIG. 9B is a front view, FIG. 9C is a bottom view and FIG. 9D is a cross-sectional view taken along line C-C shown in FIG. 9A. In FIGS. 8A and 8B, legs 370 formed on the rear side are not illustrated.

As illustrated in FIGS. 8A to 9D, light flux controlling member 300 includes recess 310, incidence surface 320, emission surface 330, rear surface 340, reflection portion 350, flange 360 and a plurality of legs 370.

Recess 310 is formed in a central portion of the rear side (light emitting element 220 side) of light flux controlling member 300. The inner surface of recess 310 functions as incidence surface 320. Incidence surface 320 allows most of the light emitted from light emitting element 220 to enter the inside of light flux controlling member 300 while controlling the traveling direction of the light. Incidence surface 320 intersects central axis CA of light flux controlling member 300 and is rotationally symmetric (circularly symmetric) about central axis CA.

Emission surface 330 is formed on the front side (light diffusion member 120 side) of light flux controlling member 300 so as to protrude from flange 360. Emission surface 330 is configured to output the light entered light flux controlling member 300 while controlling the traveling direction of the light. Emission surface 330 intersects central axis CA and is rotationally symmetric (circularly symmetric) about central axis CA.

Emission surface 330 includes first emission surface 330a located in a predetermined area about central axis CA, second emission surface 330b formed around and continued from first emission surface 330a, and third emission surface 330c connecting second emission surface 330b with flange 360 (see FIG. 9D). First emission surface 330a is a smoothly curved surface protruding to the rear side (light emitting element 220 side). The shape of first emission surface 330a is a concave shape such that a part of spherical surface is cut off. Second emission surface 330b is a smoothly curved surface protruding to the front side (light diffusion member 120 side) located around first emission surface 330a. The shape of second emission surface 330b is a toric convex shape. Third emission surface 330c is a curved surface located around second emission surface 330b. In the cross-section illustrated in FIG. 9D, the cross-sectional shape of third emission surface 330c may be linear or curved.

Rear surface 340 is a plane located on the rear side and extending radially from the opening edge of recess 310. Rear surface 340 allows light emitted from light emitting element 220 but not entered from incidence surface 320 to enter light flux controlling member 300.

Figure 10:
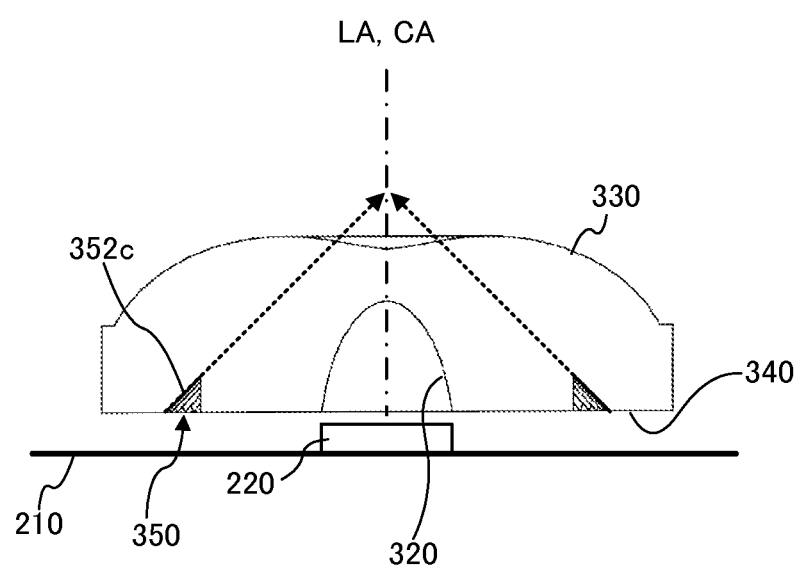
FIG. 10 is a cross-sectional view of the light flux controlling member according to Embodiment 1 to explain the directions of ridge lines.

Reflection portion 350 is disposed in a ring form on the rear side (light emitting element 220 side) of light flux controlling member 300 so as to surround the opening of recess 310. A plurality of linear protrusions 352 are formed in reflection portion 350. Linear protrusions 352 are formed such that a cross-section of each linear protrusion vertical to later-described ridge line 352c is substantially triangle-shaped, and that the linear protrusions are formed rotationally symmetric about central axis CA (when the number of the linear protrusions is n, they are n-fold symmetrical). Each linear protrusion 352 includes planar first reflection surface 352a, planar second reflection surface 352b, and ridge line 352c that is an intersection line of first reflection surface 352a and second reflection surface 352b. Linear protrusion 352 functions like a total reflection prism. As illustrated in FIG. 10, a virtual line including ridge line 352c intersects central axis CA at a position which is farther into the front side area (light diffusion member 120 side) of the light flux controlling member than ridge line 352c. That is, each linear protrusion 352 is inclined at a predetermined angle (e.g. 45°) relative to central axis CA such that the front end (light diffusion member 120 side) of linear protrusion 352 is closer to central axis CA than the rear end (light emitting element 220 side) of linear protrusion 352 is.

Reflection portion 350 will be described from a different perspective. A ring formed groove about central axis CA is formed in rear surface 340. The cross-sectional shape of the ring formed groove in a cross-section including central axis CA is substantially V-shaped. Of the two surfaces forming the V-shape, the inner surface is substantially parallel to optical axis LA of light emitting element 220, and the outer surface is inclined at a predetermined angle (e.g. 45°) relative to optical axis LA of light emitting element 220. On the outer inclining surface, linear protrusions 352 (total reflection prisms) are formed.

Reflection portion 350 reflects light, which is reflected by emission surface 330 and travels to rear surface 340, in a lateral direction (radially outside relative to central axis CA). The light reached reflection portion 350 is reflected sequentially by two surfaces (first reflection surface 352a and second reflection surface 352b) of any one of linear protrusions 352 and travels in a lateral direction. The light reflected by reflection portion 350 is output from flange 360, for example.

Reflection portion 350 is preferably located such that linear protrusions 352 are formed in a region where a large amount of light reflected by emission surface 330 reaches, but the location is not limited to thereto. Although the arrival position of the light reflected by emission surface 330 varies according to various factors such as the shape of emission surface 330, in light flux controlling member 300 according to the present embodiment illustrated in FIG. 9D, most of the light Fresnel-reflected by emission surface 330 after entered from incidence surface 320 reaches a predetermined annular region on rear surface 340 (see FIGS. 11A to 11C). In the case of light flux controlling member 20 (with the outer diameter of rear surface of 15.5 mm) used in a later-described simulation of illuminance distribution in a region facing rear surface 340 on substrate 210, the highest illuminance value is obtained in a region 5 to 6 mm apart from central axis CA (see FIG. 12). It can be deduced that the region is where a substantial amount of light Fresnel-reflected by emission surface 24 after entered from incidence surface 22 is likely to reach. Therefore, it is preferable to form a plurality of linear protrusions 352 at least in the region 5 to 6 mm apart from central axis CA in light flux controlling member 20.

Flange 360 is located between the outer peripheral portion of emission surface 330 and the outer peripheral portion of rear surface 340, and protruding radially outside. The shape of flange 360 is a substantially ring form. Although flange 360 is not an essential component, handling and alignment are easier with flange 360 formed. The thickness of flange 360 is not limited, and can be determined in view of the required area of emission surface 330, formability of flange 360, or the like.

A plurality of legs 370 are substantially cylindrical members protruding from rear surface 340. Legs 370 hold light flux controlling member 300 at an appropriate position relative to light emitting element 220.

Figure 11A:
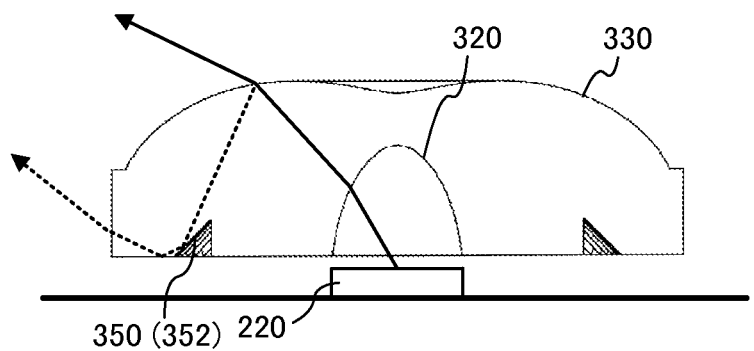
FIGS. 11A to 11C are illustrations of optical paths in the light flux controlling member according to Embodiment 1.
Figure 11B:
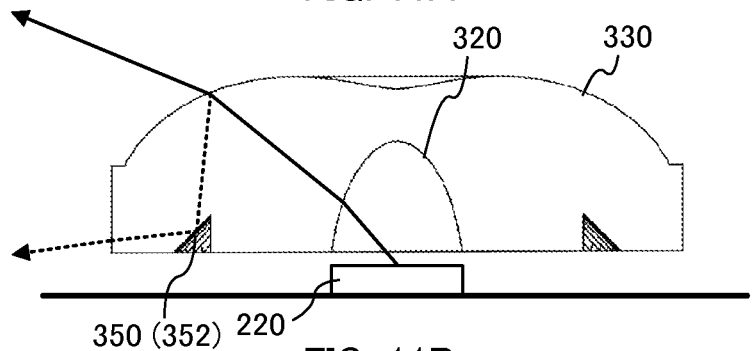
Figure 11C:
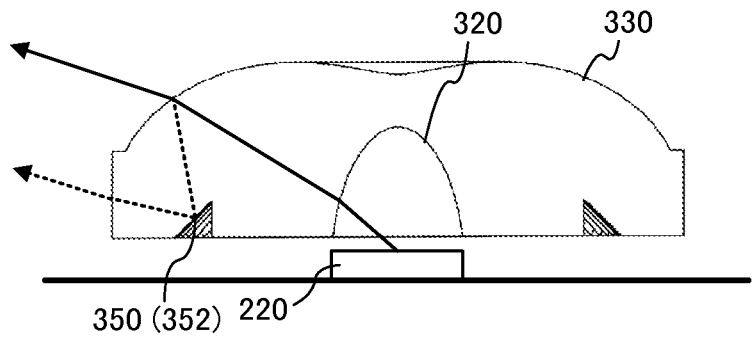

FIGS. 11A to 11C are illustrations of optical paths in light flux controlling member 300. FIG. 11A is an illustration of an optical path of a beam with emission angle 30°, FIG. 11 is an illustration of an optical path of a beam with emission angle 40°, and FIG. 11C is an illustration of an optical path of a beam with emission angle 50°. In FIGS. 11A to 11C, legs 370 are not illustrated. As illustrated in FIGS. 11A to 11C, light reflected by emission surface 330 reaches reflection portion 350 in light flux controlling member 300. The light reached reflection portion 350 is reflected sequentially by first reflection surface 352a and second reflection surface 352b of linear protrusion 352 and travels in a lateral direction.

Figure 4A:
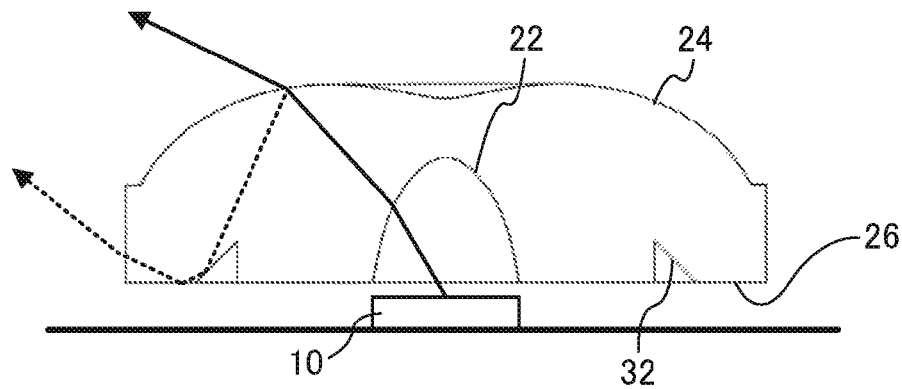
FIGS. 4A to 4C are illustrations of optical paths in the light flux controlling member illustrated in FIGS. 3A to 3C.
Figure 4B:
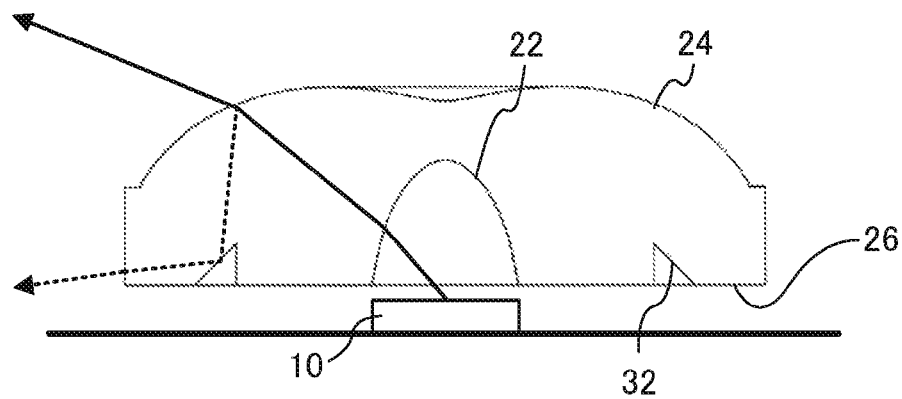
Figure 4C:
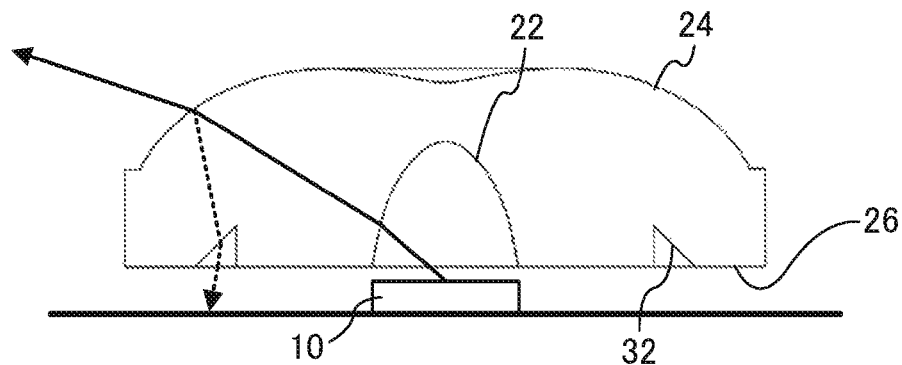

As can be seen from light flux controlling member 30 disclosed in PTL 1, when inclining surface 32 is formed in rear surface 26, the direction of light Fresnel-reflected by emission surface 24 can be changed in a lateral direction, so that light use efficiency can be increased. However, when a beam has a large emission angle, part of light reflected by emission surface 24 may reach the substrate under light flux controlling member 30 after passing through inclining surface 32 (see FIG. 4C), and further improvement may be needed. In light flux controlling member 300 according to the present embodiment, linear protrusions 352 (total reflection prisms) are formed on the inclining surface, so that a beam having a large emission angle which is Fresnel-reflected by emission surface 330 can be reflected in a lateral direction (see FIG. 11C). Therefore, in light flux controlling member 300 according to the present embodiment, more light reflected by emission surface 330 travels in lateral directions, so that the loss of light caused by light reflected by emission surface 330 being reflected by or absorbed into substrate 210 can be limited.

(Simulation of Illuminance Distribution in Region under Light Flux Controlling Member)

Figure 1A:
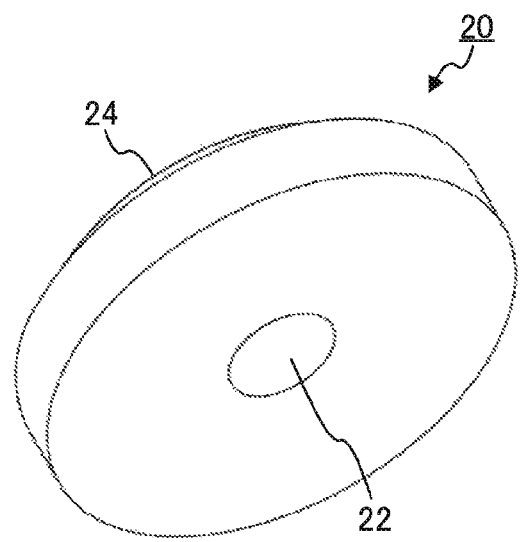
FIGS. 1A to 1C illustrate a configuration of a conventional light flux controlling member.
Figure 1B:
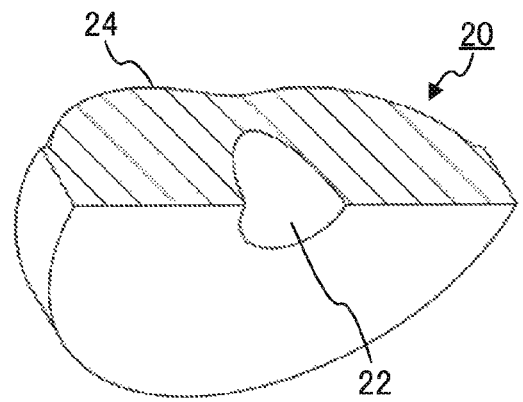
Figure 1C:
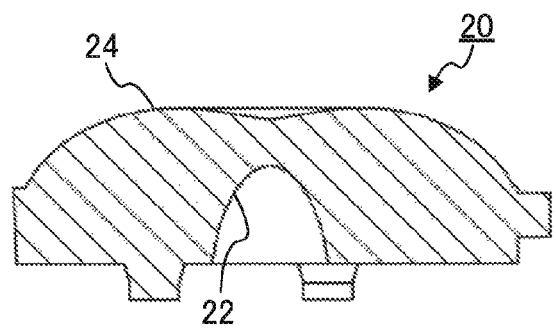
Figure 2A:
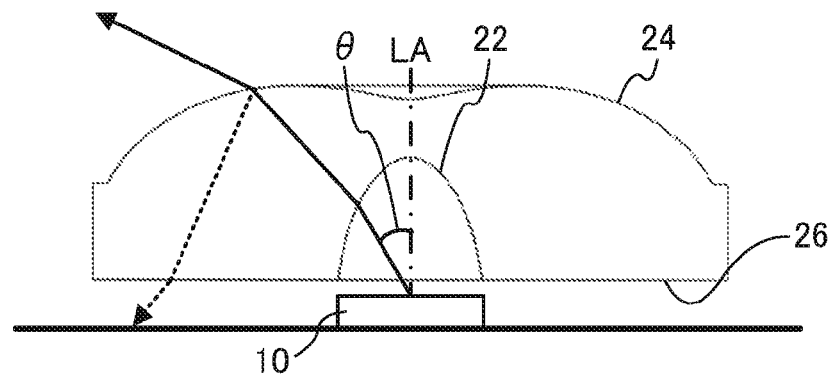
FIGS. 2A to 2C are illustrations of optical paths in the light flux controlling member illustrated in FIGS. 1A to 1C.
Figure 2B:
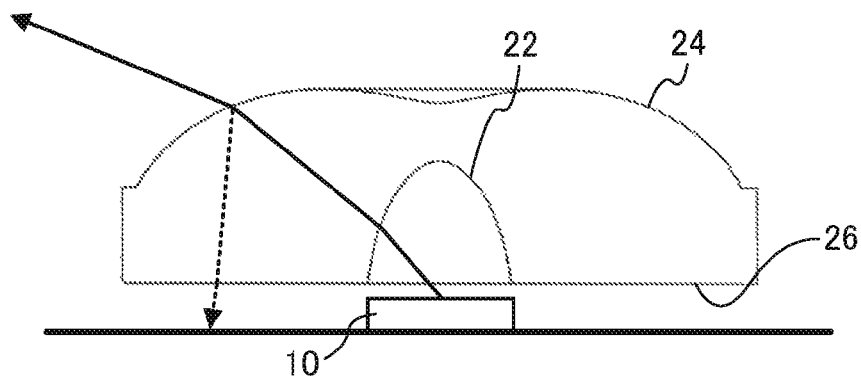
Figure 2C:
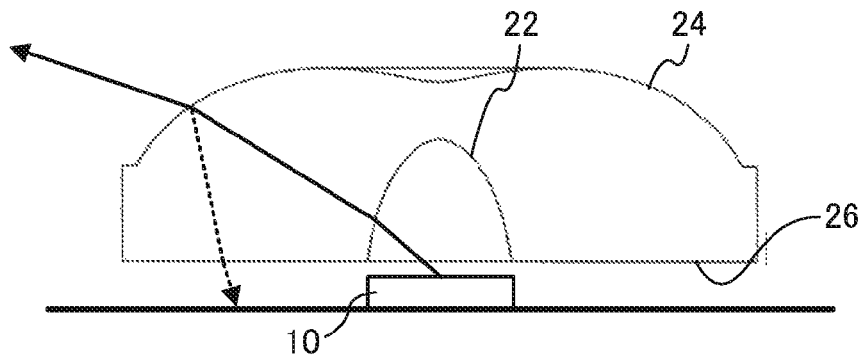
Figure 3A:
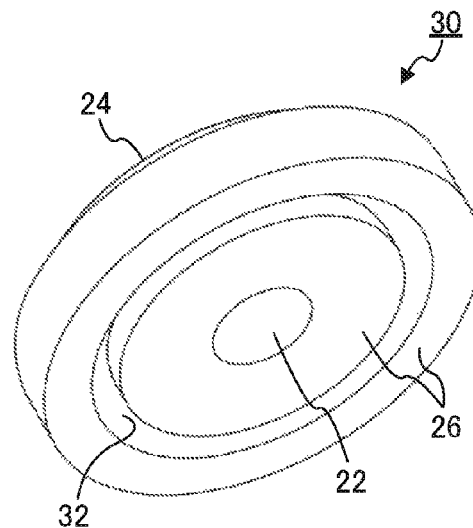
FIGS. 3A to 3C illustrate a configuration of a light flux controlling member disclosed in PTL 1.
Figure 3B:
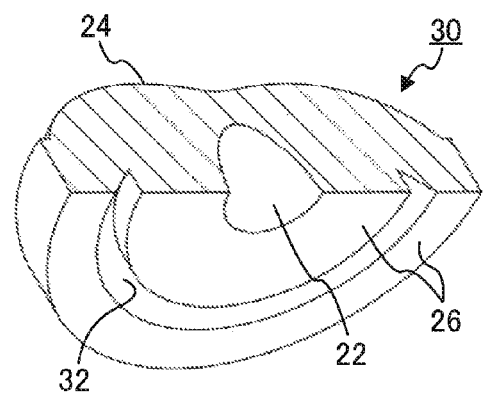
Figure 3C:
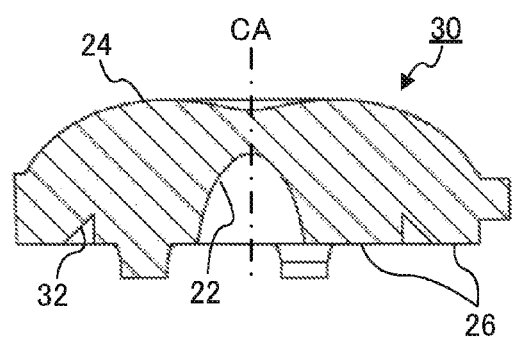

For light flux controlling member 300 according to Embodiment 1 illustrated in FIGS. 8A to 9D, the illuminance distribution in a region under the light flux controlling member was simulated. For comparison, the illuminance distribution was simulated also for conventional light flux controlling member 20 illustrated in FIGS. 1A to 1C and light flux controlling member 30 disclosed in PTL 1 illustrated in FIGS. 3A to 3C.

Figure 12:
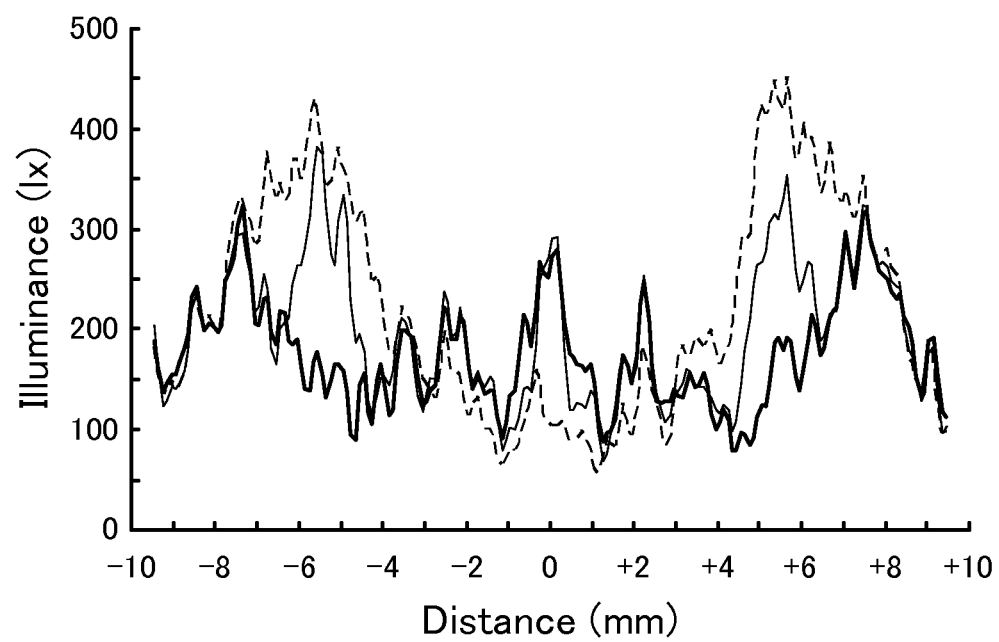
FIG. 12 is a graph illustrating illuminance distributions on the surfaces of substrates under the light flux controlling members.

In the simulation, the illuminance distribution on the surface of substrate 210 when light emitting element 220 and light flux controlling member 300 (or 20 or 30) are disposed on substrate 210 illustrated in FIG. 7 was measured. Light reached the surface of substrate 210 was set to be not reflected but absorbed. Three light flux controlling members 300, 20 and 30 used for simulations are different from each other only in that whether or not they have inclining surface 32 or reflection portion 350 on the rear sides. Parameters for light flux controlling members 300, 20 and 30 were set as follows:

(Common Parameters)
Outer diameter of emission surface: 14.778 mm
Outer diameter of rear surface: 15.5 mm
Opening diameter of recess: 3.53 mm
Height from surface of substrate to rear surface: 1.1 mm
Height from surface of substrate to highest point of emission surface: 5.867 mm
(Parameters Only for Light Flux Controlling Member 30)
Outer diameter of inclining surface: 6.057 mm
Angle of inclining surface: 45° relative to optical axis
(Parameters Only for Light Flux Controlling Member 300)
Outer diameter of reflection portion: 6.057 mm
Angle of ridge line: 45° relative to optical axis FIG. 12 is a graph illustrating the illuminance distribution on the surface of substrates under the light flux controlling member. The abscissa represents the distance (mm) from the central axis of the light flux controlling member on the line intersecting the central axis of the light flux controlling member. The ordinate represents the illuminance (lx) at different points. The result of light flux controlling member 20 having no inclining surface is shown by thin dashed line, the result of light flux controlling member 30 not having a plurality of linear protrusions but having an inclining surface is shown by thin solid line, and the result of light flux controlling member 300 having a plurality of linear protrusions is shown by thick solid line. As shown in the graph, the illuminance in the region 4.5 to 6.5 mm apart from the central axis is different among the light flux controlling members. That is, the illuminance in the region under light flux controlling member 30 having the inclining surface (see FIGS. 3A to 3C) is lower than the illuminance in the region under light flux controlling member 20 having no inclining surface (see FIGS. 1A to 1C). Further, the illuminance in the region under light flux controlling member 300 having the linear protrusions (see FIGS. 8A to 9D) is lower than the illuminance in the region under light flux controlling member 30 having the inclining surface (but not having a plurality of linear protrusions) (see FIGS. 3A to 3C).

Figure 13:
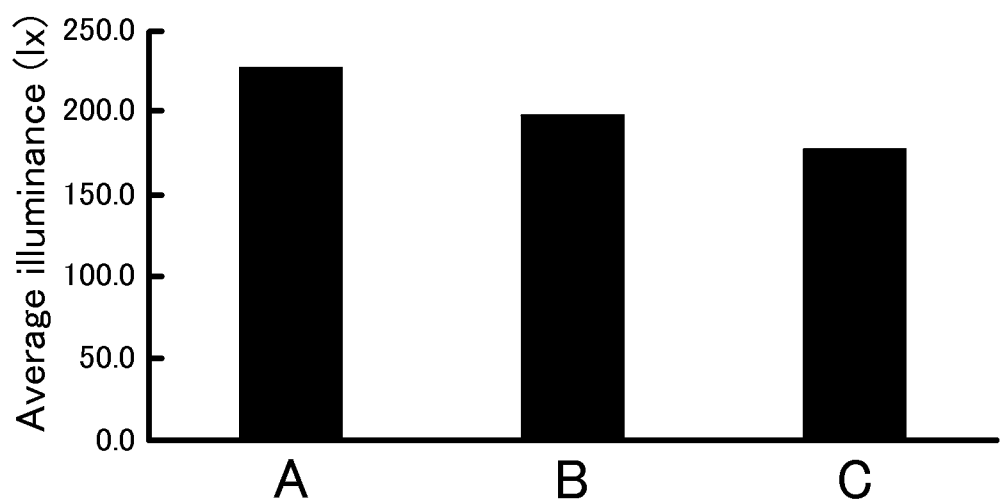
FIG. 13 is a graph illustrating average illuminances in regions under the light flux controlling members.

FIG. 13 is a graph illustrating average illuminance (lx) in the region under light flux controlling member (circular region with a diameter of 19 mm) On the abscissa, "A" represents light flux controlling member 20 having no inclining surface, "B" represents light flux controlling member 30 not having a plurality of linear protrusions but having the inclining surface, and "C" represents light flux controlling member 300 having the linear protrusions. This graph also shows that light flux controlling member 300 having the linear protrusions (see FIGS. 8A to 9D) exhibits low illuminance in the region under the flux controlling member compared to flux controlling member 20 having no inclining surface (see FIGS. 1A to 1C) and flux controlling member 30 having the inclining surface (but not having a plurality of linear protrusions) (see FIGS. 3A to 3C).

Figure 14:
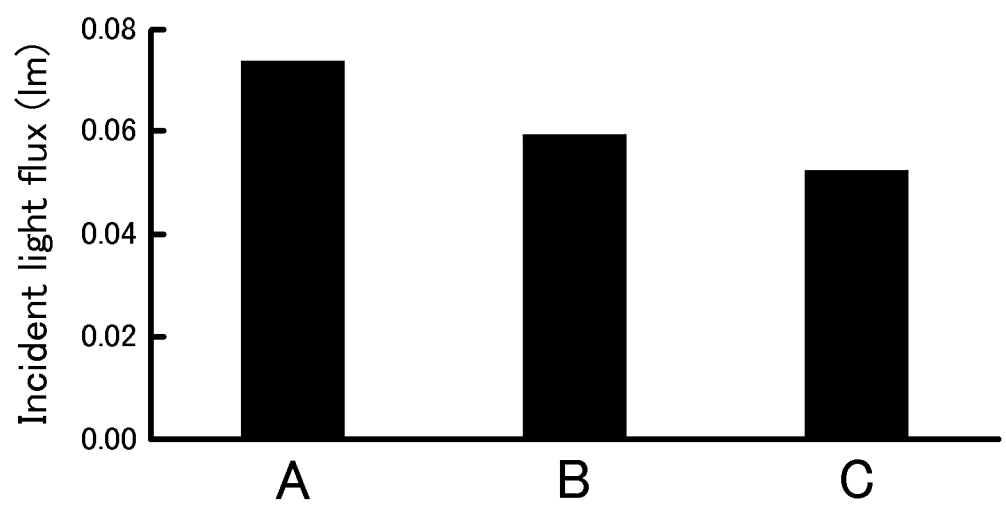
FIG. 14 is a graph illustrating incident light fluxes in the regions under the light flux controlling members.

FIG. 14 is a graph illustrating incident light flux (lm) in the region under the light flux controlling member (circular region with diameter 19 mm) Also on the abscissa of this graph, "A" represents light flux controlling member 20 having no inclining surface, "B" represents light flux controlling member 30 not having a plurality of linear protrusions but having the inclining surface, and "C" represents light flux controlling member 300 having the linear protrusions. The amount of light flux from a light emitting element is 1 lm. This graph also shows that light flux controlling member 300 having the linear protrusions (see FIGS. 8A to 9D) exhibits a small amount of light flux reached the region under the flux controlling member compared to flux controlling member 20 having no inclining surface (see FIGS. 1A to 1C) and flux controlling member 30 having the inclining surface (but not having a plurality of linear protrusions) (see FIGS. 3A to 3C).

As described above, in light flux controlling member 300 according to the present embodiment, the light reflected by emission surface 330 does not easily travel in the direction directly above light flux controlling member 300 or is not easily absorbed into substrate 210. Therefore, light emitting device 200 according to the present invention can radiate light more efficiently and uniformly than light emitting devices including the conventional light flux controlling member.

Figure 15A:
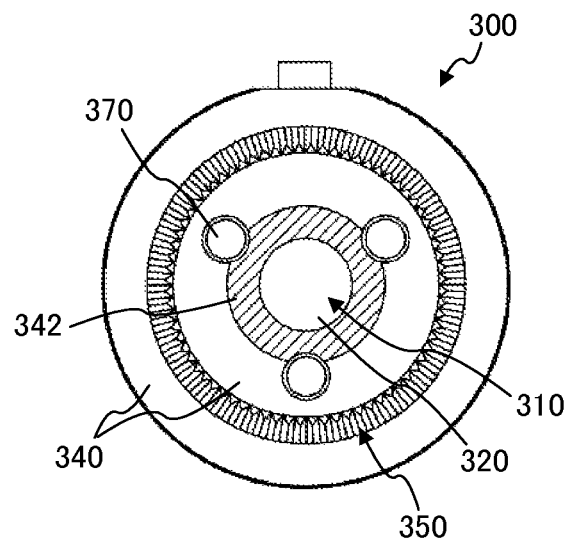
FIGS. 15A and 15B are bottom illustrations of modifications of the light flux controlling member according to Embodiment 1.
Figure 15B:
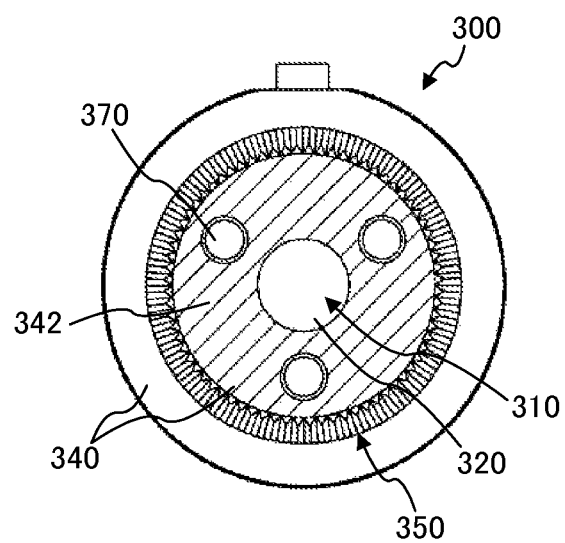

In the present embodiment, light flux controlling member 300 in which rear surface 340 is a flat surface is described, but a part or all of rear surface 340 may be a light scattering surface. For example, as illustrated in FIGS. 15A and 15B, a part of rear surface 340 may be light scattering surface 342 (the region indicated by hatching). In FIG. 15A, the region inside legs 370 is roughened. In FIG. 15B, the region inside reflection portion 350 is roughened. When a part or all of rear surface 340 is a light scattering surface, luminance unevenness caused by light entered from rear surfaces 340 being gathered in an unintended direction can be prevented.

To obtain such an effect, it is preferable that a region of rear surface 340 where light from light emitting element 220 may directly reach be a light scattering surface. The size of the region varies according to the distance between light emitting element 220 and rear surface 340, the size of light emitting element 220, the size of the opening of recess 310, or the like. Therefore, the region to be a light scattering surface may be appropriately set according to these parameters.

Embodiment 2

(Configurations of Surface Light Source Device and Light Emitting Device)

A surface light source device and light emitting device according to Embodiment 2 differ from surface light source device 100 and light emitting device 200 according to Embodiment 1 illustrated in FIGS. 5A to 7 in that the former include light flux controlling member 400 according to Embodiment 2 instead of light flux controlling member 300 according to Embodiment 1. Accordingly, only light flux controlling member 400 according to Embodiment 2 will be described in the present embodiment.

(Configuration of Light Flux Controlling Member)

Figure 16A:
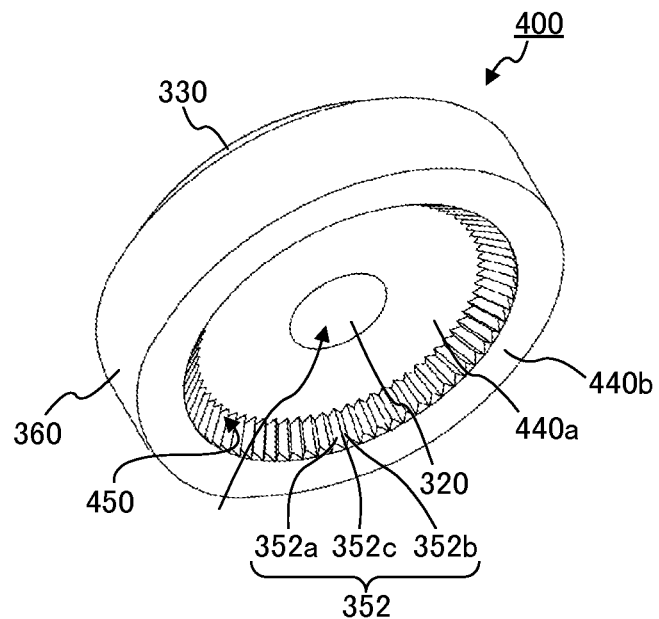
FIGS. 16A and 16B illustrate a configuration of a light flux controlling member according to Embodiment 2.
Figure 16B:
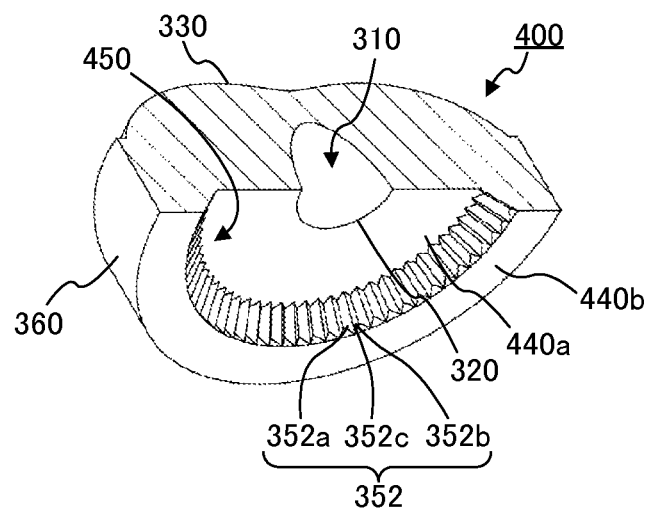

FIGS. 16A to 17D illustrate a configuration of light flux controlling member 400 according to Embodiment 2. FIG. 16A is a perspective view from the rear side, and FIG. 16B is a cross-sectional perspective view from the rear side. FIG. 17A is a plan view, FIG. 17B is a front view, FIG. 17C is a bottom view and FIG. 17D is a cross-sectional view taken along line D-D shown in FIG. 17A. In FIGS. 16A and 16B, legs 370 formed on the rear side are not illustrated.

As illustrated in FIGS. 16A to 17D, light flux controlling member 400 includes recess 310, incidence surface 320, emission surface 330, first rear surface 440a, second rear surface 440b, reflection portion 450, flange 360 and a plurality of legs 370. Elements that overlap with those of light flux controlling member 300 illustrated in FIGS. 8A to 9D are provided with symbols that are the same as those in FIGS. 8A to 9D, and a description thereof will be omitted.

In light flux controlling member 400 according to Embodiment 2, reflection portion 450 is formed lower (substrate 210 side) than the opening of recess 310. Hence, on the rear side of light flux controlling member 400, first rear surface 440a that is a plane extending from the opening edge of recess 310 to the upper end of reflection portion 450, and second rear surface 440b that is a plane extending radially from the lower end of reflection portion 450 are formed. First rear surface 440a allows light emitted from light emitting element 220 but not entered from incidence surface 320 to enter light flux controlling member 400.

(Effect)

Light flux controlling member 400 according to Embodiment 2 has the same effect as light flux controlling member 300 according to Embodiment 1. In light flux controlling member 300 according to Embodiment 1, light entered from incidence surface 320 at a large angle relative to optical axis LA may be reflected by reflection portion 350 in an unintended direction after reaching reflection portion 350. On the other hand, in light flux controlling member 400 according to Embodiment 2, reflection portion 450 is formed lower than the opening of recess 310, so that such unintended reflections do not occur.

Figure 18A:
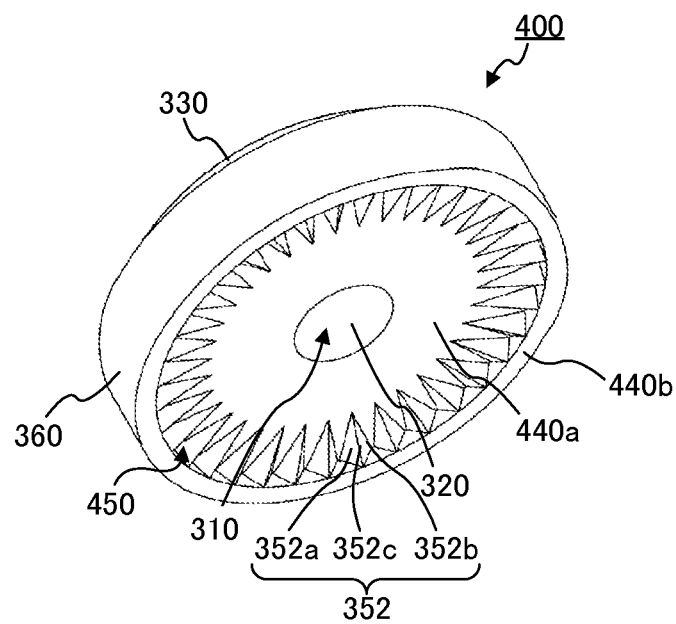
FIGS. 18A and 18B illustrate a modification of the light flux controlling member according to Embodiment 2.
Figure 18B:
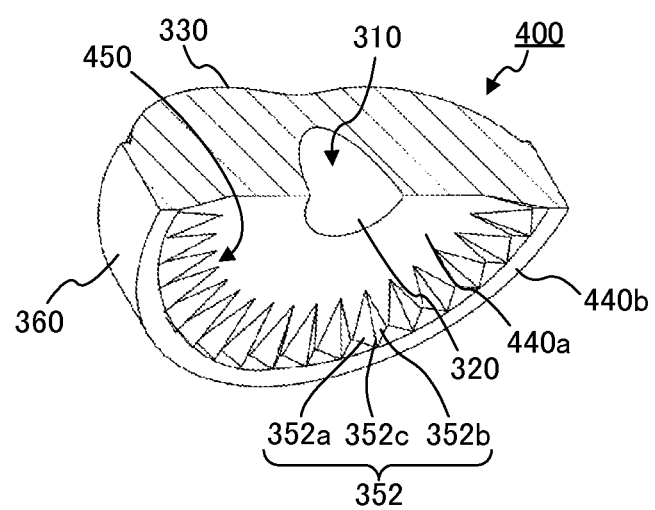
Figure 19A:
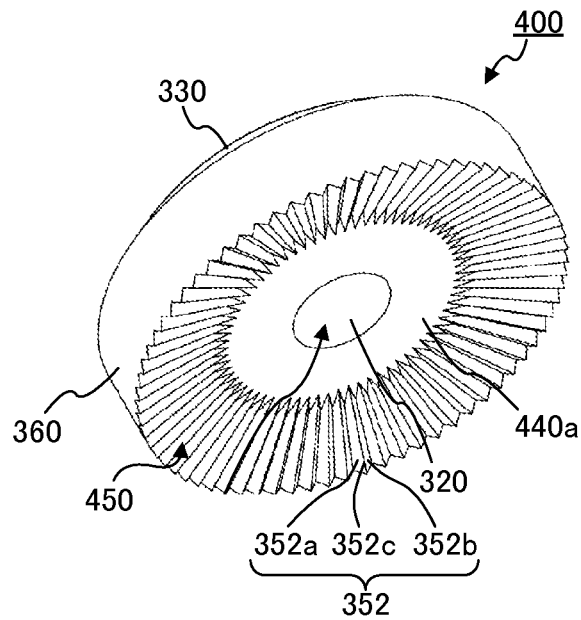
FIGS. 19A and 19B illustrate another modification of the light flux controlling member according to Embodiment 2.
Figure 19B:
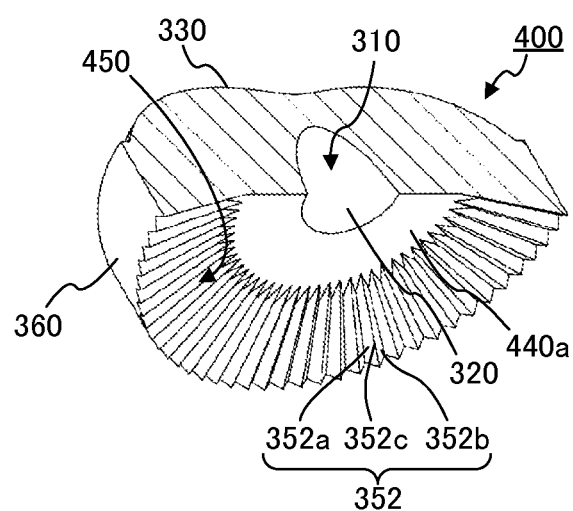

In light flux controlling member 400 according to the present embodiment, the size of the region accepting reflected light from emission surface 330 can be controlled by adjusting the parameters of reflection portion 450 (e.g. the size and inclination of first reflection surface 352a and second reflection surface 352b, and the length and inclination of ridge line 352c). For example, as illustrated in FIGS. 18A and 18B, the area of second rear surface 440b may be smaller, or the intervals between ridge lines 352c in reflection portion 450 may be longer. Further, as illustrated in FIGS. 19A and 19B, the area of reflection portion may be larger by not forming second rear surface 440b. In FIGS. 18A to 19B, legs 370 formed on the rear side are not illustrated.

In light flux controlling member 300 and 400 according to the present embodiment, each ridge line 352c may be formed by chamfering the ridge formed by two reflection surfaces 352a and 352b intersecting each other.

Further, in the mode such as light flux controlling member 400 according to Embodiment 2 in which reflection portion 450 is formed lower (substrate 210 side) than the opening of recess 310, light flux can be controlled more efficiently by expanding the area of emission surface 330 by forming thinner flange 360 with due considerations of handling and formability.

Embodiment 3

(Configurations of Surface Light Source Device and Light Emitting Device)

A surface light source device and light emitting device according to Embodiment 3 differ from surface light source device 100 and light emitting device 200 according to Embodiment 1 illustrated in FIGS. 5A to 7 in that the former include light flux controlling member 500 according to Embodiment 3 instead of light flux controlling member 300 according to Embodiment 1. Accordingly, only light flux controlling member 500 according to Embodiment 3 will be described in the present embodiment.

(Configuration of Light Flux Controlling Member)

Figure 20:
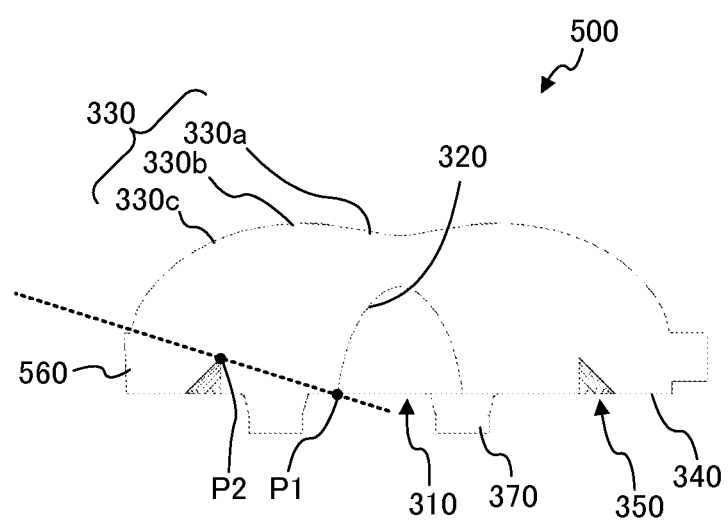
FIG. 20 is a cross-sectional view of a light flux controlling member according to Embodiment 3.

FIG. 20 is a cross-sectional view of light flux controlling member 500 according to Embodiment 3.

As illustrated in FIG. 20, light flux controlling member 500 includes recess 310, incidence surface 320, emission surface 330, rear surface 340, reflection portion 350, flange 560 and a plurality of legs 370. Elements that overlap with those of light flux controlling member 300 illustrated in FIGS. 8A to 9D are provided with symbols that are the same as those in FIGS. 8A to 9D, and a description thereof will be omitted.

In light flux controlling member 500 according to Embodiment 3, the thickness of flange 560 in the central axis CA direction is small. As described above, the thickness of flange 560 is not limited, and can be determined in view of the required area of emission surface 330, formability of flange 560, and the like. In light flux controlling members 300 and 400 according to Embodiments 1 and 2, part of light entered light flux controlling members 300 and 400 from the vicinity of the openings of recesses 310 directly reaches flange 360. Since flange 360 is not intended for controlling the distribution of light, it is not desirable that light directly reach flange 360. In light flux controlling member 500 according to the present embodiment, more light entered from the vicinity of the opening of recess 310 can directly reach emission surface 330. In the present embodiment, flange 560 is formed lower (rear surface 340 side) than a line (dashed line in FIG. 20) passing through opening edge P1 of recess 310 and the innermost point P2 of reflection portion 350 (ring formed groove) in a cross-section including central axis CA. In this way, emission surface 330 of light flux controlling member 500 according to Embodiment 3 is formed larger than emission surface 330 of light flux controlling member 300 according to Embodiment 1, and can output more controlled light.

(Simulation of Illuminance Distribution in Region under Light Flux Controlling Member)

For light flux controlling member 500 according to Embodiment 3 illustrated in FIG. 20 (hereinafter also referred to as light flux controlling member (f)), the illuminance distribution in a region under the light flux controlling member was simulated. For comparison, the illuminance distribution in a region under the light flux controlling member was also simulated for: conventional light flux controlling member 20 (hereinafter also referred to as light flux controlling member (a)) illustrated in FIGS. 1A to 1C; light flux controlling member 30 (hereinafter also referred to as light flux controlling member (b)) disclosed in PTL 1 illustrated in FIGS. 3A to 3C; light flux controlling member 300 (hereinafter also referred to as light flux controlling member (c)) according to Embodiment 1 illustrated in FIGS. 8A to 9D; light flux controlling member (d) whose flange is made thinner in conventional light flux controlling member 20 (light flux controlling member (a)) so that light entered from the vicinity of the opening of the recess can directly reach the emission surface; and light flux controlling member (e) whose flange is made thinner in light flux controlling member 30 (light flux controlling member (b)) disclosed in PTL 1 so that light entered from the vicinity of the opening of the recess can directly reach the emission surface. The amounts of light fluxes in the regions under light flux controlling members (b) to (f) were calculated relative to the amount of light flux in the region under conventional light flux controlling member 20 (light flux controlling member (a)) as 100%.

In the simulation, the amount of light flux to the surface of substrate 210 when light emitting element 220 and each of light flux controlling members (a) to (f) are disposed on substrate 210 illustrated in FIG. 7 was measured. Parameters for each of light flux controlling members (a) to (f) are the same as in the simulation carried out in Embodiment 1 except for the thickness of the flange. The thicknesses of the flanges of light flux controlling members (a), (b) and (c) in the central axis CA direction are 2.35 mm, and the thicknesses of the flanges of light flux controlling members (d), (e) and (f) in the central axis CA direction are 1.7 mm. The light flux controlling members used in the simulation, the thicknesses of flanges, the relative values of the amounts of light fluxes to substrate 210 are shown in Table 1.

TABLE 1

| Light flux controlling member | a | b | c | d | e | f |
|---|---|---|---|---|---|---|
| Feature of rear surface | Flat surface | Inclining surface | Inclining surface linear protrusions | Flat surface | Inclining surface | Inclining surface linear protrusions |
| Thickness of flange (mm) | 2.35 | 2.35 | 2.35 | 1.7 | 1.7 | 1.7 |
| Relative value of amount of light flux (%) | 100 | 81 | 71 | 97 | 78 | 64 |

As shown in Table 1, the amount of light flux is low in the region under the light flux controlling members (d) to (f) having thin flange (1.7 mm), in which even light entered from the vicinity of the opening of the recess can directly reach the emission surface, compare to light flux controlling members (a) to (c) having thick flange (2.35 mm), in which part of light entered from the vicinity of the opening of the recess directly reaches the flange. Further, the amount of light flux is low in the region under light flux controlling member (f) according to the present embodiment, which has an inclining surface, a plurality of linear protrusions and the thin flange, compare to light flux controlling members (a) and (d) having no inclining surface, light flux controlling members (b) and (e) having inclining surfaces (but not having a plurality of linear protrusions), and light flux controlling member (c) having an inclining surface, a plurality of linear protrusions and the thick flange. It can be understood that light flux controlling member (f) according to the present embodiment can control the distribution of more light.

(Effect)

Light flux controlling member 500 according to Embodiment 3 has the same effect as light flux controlling member 300 according to Embodiment 1. Further in light flux controlling member 500 according to Embodiment 3, flexibility of design of emission surface 330 can be enhanced by forming thin flange 560. Further, light flux controlling member 500 according to Embodiment 3 can control the distribution of more light due to large emission surface 330.

When trying to form emission surface 330 without flange 560, which can control traveling directions of light to required light emitting directions, the diameter of the light flux controlling member may increase. In that case, the light flux controlling member may be appropriately designed with due considerations of the balance between the form of the light flux controlling member and emitted light.

This application claims priority based on Japanese Patent Application No. 2012-186459, filed on Aug. 27, 2012, and Japanese Patent Application No. 2013-064009 filed on Mar. 26, 2013, the entire contents of which including the specifications and the drawings are incorporated herein by reference.

INDUSTRIAL APPLICABILITY

The light flux controlling member, light emitting device and surface light source device of the present invention may be employed in a backlight of a liquid crystal display apparatus or a general lighting.

REFERENCE SIGNS LIST 10 light emitting element
20, 30 light flux controlling member
22 incidence surface
24 emission surface
26 rear surface
32 inclining surface
100 surface light source device
110 casing
112 bottom plate
114 top plate
120 light diffusion member
200 light emitting device
210 substrate
220 light emitting element
300, 400, 500 light flux controlling member
310 recess
320 incidence surface
330 emission surface
340 rear surface
342 light scattering surface
350, 450 reflection portion
352 linear protrusion
352a first reflection surface
352b second reflection surface
352c ridge line
360, 560 flange
370 leg
440a first rear surface
440b second rear surface
P1 opening edge of recess
P2 innermost point of reflection portion

The invention claimed is:

1. A light flux controlling member configured to control a distribution of light emitted from a light emitting element, the light flux controlling member comprising:
an incidence surface constituting an inner surface of a recess formed on a rear side of the light flux controlling member so as to intersect a central axis of the light flux controlling member, the incidence surface being configured such that light emitted from the light emitting element is incident on the incidence surface;
an emission surface formed on a front side of the light flux controlling member so as to intersect the central axis, the emission surface being configured to output light entered from the incidence surface towards an outside; and
a plurality of linear protrusions each having a cross-section that is substantially triangle-shaped, the linear protrusions being formed to surround an opening of the recess; wherein
each of the plurality of linear protrusions includes a first reflection surface, a second reflection surface, and a ridge line that is an intersection line of the first reflection surface and the second reflection surface, each of the plurality of linear protrusions reflects light from the emission surface by sequentially reflecting at the first reflection surface and the second reflection surface, the plurality of linear protrusions are disposed rotationally symmetric about the central axis and are separated from the recess, and a virtual line including the ridge line intersects the central axis at a position which is farther into a front side area of the light flux controlling member than the ridge line.

2. A light emitting device comprising a light emitting element and the light flux controlling member according to claim 1, wherein the light flux controlling member is disposed such that the central axis coincides with an optical axis of the light emitting element.

3. A surface light source device comprising the light emitting device according to claim 2 and a light diffusion member which diffuses and transmits light emitted from the light emitting device at the same time.

4. A display apparatus comprising the surface light source device according to claim 3 and a display member to which light emitted from the surface light source device is radiated.

* * * * *